(12) United States Patent
Scott et al.

(10) Patent No.: US 8,532,710 B2
(45) Date of Patent: *Sep. 10, 2013

(54) INTEGRATED DIALING

(75) Inventors: Sherryl Lee Lorraine Scott, Toronto (CA); Lawrence Edward Kuhl, Waterloo (CA); Keizo Marui, Waterloo (CA); Matthew Lee, Belleville (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,101

(22) Filed: Aug. 24, 2012

(65) Prior Publication Data

US 2012/0322427 A1 Dec. 20, 2012

Related U.S. Application Data

(63) Continuation of application No. 13/306,021, filed on Nov. 29, 2011, now Pat. No. 8,260,362, which is a continuation of application No. 11/743,914, filed on May 3, 2007, now Pat. No. 8,095,186.

(60) Provisional application No. 60/824,431, filed on Sep. 1, 2006.

(51) Int. Cl.
*H04M 1/275* (2006.01)

(52) U.S. Cl.
USPC ............ 455/564; 455/466; 379/355.03

(58) Field of Classification Search
USPC ............ 455/414.1–414.4, 564–566, 418; 379/142.01–142.18, 201.01–201.12, 355.01–357.05; 345/168

See application file for complete search history.

(56) References Cited

U.S. PATENT DOCUMENTS

| 6,370,518 | B1 | 4/2002 | Payne et al. |
| 6,950,988 | B1 * | 9/2005 | Hawkins et al. ............ 715/700 |
| 7,007,239 | B1 | 2/2006 | Hawkins et al. |
| 7,262,761 | B1 * | 8/2007 | Duarte et al. ............... 345/168 |
| 8,095,186 | B2 | 1/2012 | Scott et al. |
| 2002/0039915 | A1 * | 4/2002 | Hama et al. ................. 455/566 |
| 2002/0052196 | A1 * | 5/2002 | Padawer et al. ............. 455/414 |
| 2004/0080487 | A1 * | 4/2004 | Griffin et al. ............... 345/156 |

(Continued)

FOREIGN PATENT DOCUMENTS

| EP | 1193656 A2 | 4/2002 |
| EP | 1193956 A2 * | 4/2002 |

(Continued)

OTHER PUBLICATIONS

Extended European Search Report issued Aug. 8, 2008 in connection with corresponding European patent application No. 07719697.0.

(Continued)

*Primary Examiner* — Kashif Siddiqui
(74) *Attorney, Agent, or Firm* — Ridout & Maybee LLP

(57) ABSTRACT

Call initiation on a device with potential for a large number of stored telephone numbers is simplified through the use of an integrated field for entry of an ambiguous filter string. As it is not clear, a priori, whether the user is manually specifying, in the integrated field, a telephone number or providing a filter string for filtering contacts, filtering is performed based on at least one filter string. Among the contacts that are part of a filtering result list, a default contact is selected for quick access.

25 Claims, 13 Drawing Sheets

(56) References Cited

U.S. PATENT DOCUMENTS

| | | | |
|---|---|---|---|
| 2006/0002536 A1* | 1/2006 | Ambrose | 379/201.01 |
| 2006/0059185 A1 | 3/2006 | Bocking et al. | |
| 2006/0154658 A1* | 7/2006 | Holder et al. | 455/418 |
| 2007/0130200 A1* | 6/2007 | Ogren | 707/104.1 |

FOREIGN PATENT DOCUMENTS

| | | |
|---|---|---|
| JP | 200270079 | 9/2000 |
| JP | 2004208217 | 7/2004 |
| JP | 2005268984 | 9/2005 |
| KR | 1020030070104 A | 4/2005 |
| KR | 1020040010881 A | 8/2005 |

OTHER PUBLICATIONS

Examination Report issued Aug. 28, 2008 in connection with corresponding European patent application No. 07719697.0.

Korean Patent Office, Notice Requested Submission of Opinion dated Oct. 15, 2009.

Japanese Patent Office, Notice of Reasons for Rejection, regarding application No. JP 2008-533839, dated Aug. 10, 2010.

* cited by examiner

INTEGRATED DIALING

CROSS REFERENCE TO RELATED APPLICATIONS

The present application is a continuation application of U.S. patent application Ser. No. 13/306,021, filed Nov. 29, 2011, the contents of which are hereby incorporated herein by reference. U.S. patent application Ser. No. 13/306,021 is a continuation application of U.S. patent application Ser. No. 11/743,914, filed May 3, 2007, the contents of which are hereby incorporated herein by reference. The present application claims priority to U.S. Provisional Patent Application Ser. No. 60/824,431, filed Sep. 1, 2006, the contents of which are hereby incorporated herein by reference.

FIELD OF THE INVENTION

The present application relates generally to initiating a communication and, more specifically, to a determination of a destination address to specify for the communication.

BACKGROUND OF THE INVENTION

There was a time when the act of "dialing" a telephone number actually involved causing a dial to rotate around a central pivot point. At the time, it was typically only required, at least in North America, to dial a seven-digit telephone number to specify the terminal to which one wished to be connected. To place a call to a terminal outside of a geographical area defined as one's local calling area, i.e., to place a "long distance" call, the digit "1" and a three digit area code was required to precede the seven-digit telephone number.

Today, due to the proliferation of mobile telephone networks and facsimile machines, telephone service providers in many North American metropolitan areas have been required to add an additional, overlapping three digit area code to many geographic areas already defined by an area code. As such, even for local calls, a full ten-digit telephone number is required to specify a particular terminal.

Furthermore, rather than being "dumb" terminals, many telephones today have significant processing power and memory built-in. Cordless telephone handsets that are particularly well suited to home use are known to store calling line identification information (i.e., caller ID) as well as a short list of frequently called numbers. Many mobile (cellular) telephones have memory to store large numbers of telephone numbers in conjunction with information such as contact name and type of telephone number (e.g., business, facsimile, mobile, home, etc.). Contact management software, in use on many desktop and notebook computers, is known to be capable of storing a significant amount of information associated with each contact name. Portable Digital Assistants (PDAs) and handheld computers have been developed along with mechanisms for synchronizing a contact database managed by a contact management application on a full-size computer with a contact database managed by contact management application on a PDA or a handheld computer. Additionally, the PDAs and handheld computers are, increasingly, being provided with mobile telephone capabilities. When such mobile telephone capabilities are combined with the information readily available in the extensive contact management databases also available on such devices, the act of placing a call can be seen to have come a long way from causing a dial to rotate around a central pivot point.

However, the complexity of placing a call to a contact with such available technology, even where the contact is called on a frequent basis, can make one remember fondly the simplicity of the dial. For instance, using the operating system of a popular PDA with mobile telephone capabilities to place a call to a contact may involve first initializing a phone application, selecting a favorites button, selecting a particular database entry associated with the contact, selecting a particular telephone number from the database entry and initializing the call to the particular telephone number. In the operating system of another popular device, after initializing a phone application, a user may cause a menu to appear, select "dial from address book" from the menu, select a database entry for a contact from the contact management database, select a particular telephone number in the database entry and initialize the call to the particular telephone number.

Clearly the act of initializing a telephone call on a device with an advanced contact management database would benefit from simplification. In addition, rather than a telephone call, an alternate manner of communication may be desired.

BRIEF DESCRIPTION OF THE DRAWINGS

Reference will now be made to the drawings, in which.

DETAILED DESCRIPTION OF THE EMBODIMENTS

The act of initializing a communication on a device with an advanced contact management database is simplified by generating a display string and at least one filter string based on ambiguous input. While the ambiguous input remains potentially entirely numeric, the display string remains numeric. A master list is formed by filtering the advanced contact management database based on the at least one filter string. Among the contacts that are part of the master list, a default contact is selected for quick access. Communication is initialized based on user input indicating a selection between the display string and a reference to a contact in the master list.

In accordance with an aspect of the present application there is provided a method of initiating a communication. The method includes receiving an indication of a selection of a key, the key associated with an alphabetic character and a numeric character, adding the numeric character associated with the key to a display string and adding the alphabetic character associated with the key to a filter string. The method further includes filtering a contact management database to form a list of references to database entries, where references in the list refer to entries in the contact management database that include the filter string, receiving a user selection between the display string and a given reference in the list of references and, based on the user selection, initiating a communication. In other aspects of the present application, an apparatus is provided for carrying out this method and a computer readable medium is provided for adapting a processor to carry out this method.

Other aspects and features of the present application will become apparent to those of ordinary skill in the art upon review of the following description of specific embodiments of the application in conjunction with the accompanying figures.

Figure 1:
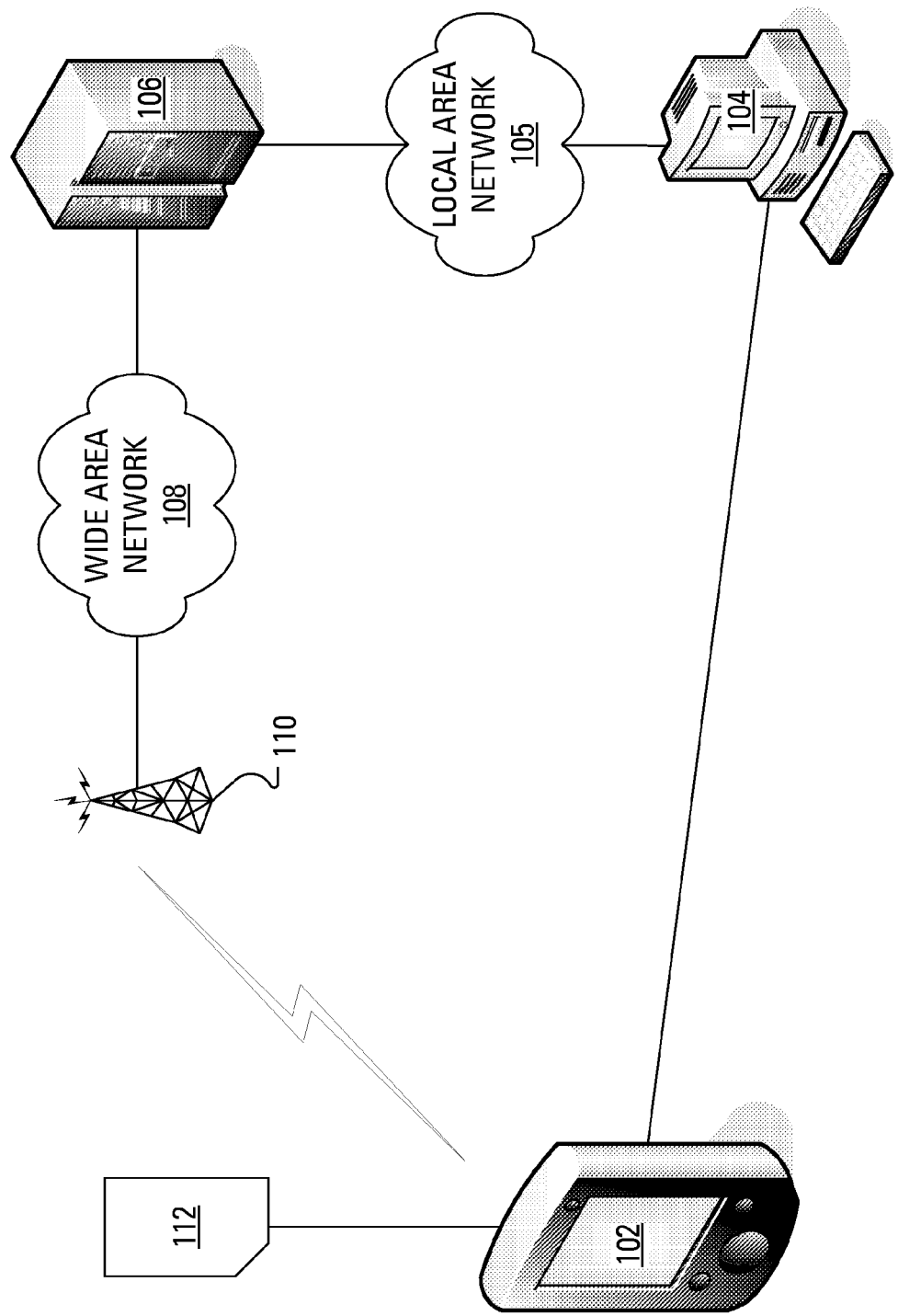
FIG. 1 illustrates a typical operating environment for a handheld computer.

FIG. 1 illustrates a typical operating environment for a handheld computer 102. In particular, the handheld computer 102 is shown as associated with a personal computer 104. The data items maintained by a Personal Information Manager (PIM) application executed on the handheld computer 102 may occasionally be synchronized with a PIM application executed on the personal computer 104.

As is known, the synchronization between the personal computer 104 and the handheld computer 102 may be accomplished via a wireline connection such as a direct serial connection or a Universal Serial Bus (USB) connection. Furthermore, the synchronization between the personal computer and the handheld computer may be accomplished via a wireless connection such as an infrared connection, a Bluetooth™ connection or a wireless local area network (WiFi, IEEE 802.11) connection.

The personal computer 104 may communicate, through a local area network (LAN) 105, with an enterprise server 106 such that the PIM application executed on the personal computer 104 may act as a client to the enterprise server 106. Such enterprise servers are known to include Microsoft Exchange servers and IBM Lotus Notes servers. Notably, synchronization between the data items accessed by the PIM application on the personal computer 104 and data items maintained by the PIM application executed on the handheld computer 102 may occur directly between the enterprise server 106 and the handheld computer 102 using a radio frequency (RF), e.g., Mobitex™, DataTAC™, General Packet Radio Service, data connection.

Where the handheld computer 102 is a mobile communication device, the handheld computer 102 may communicate over an RF data connection with an antenna 110 that is representative, in FIG. 1, of a wireless communication network. As is typical, the wireless communication network is illustrated as communicatively connected to a wide area network (WAN) 108, which may comprise the modern-day Internet and successors. Through the wireless connection to the antenna 110, the wireless communication network and the WAN 108, the data items on the handheld computer 102 may be synchronized with the data items on the enterprise server 106.

The handheld computer 102 may be loaded with computer readable instructions for executing methods exemplary of the present application from a software medium 112 which could be a disk, a tape, a chip, a flash memory card or a random access memory containing a file downloaded from a remote source.

Figure 2:
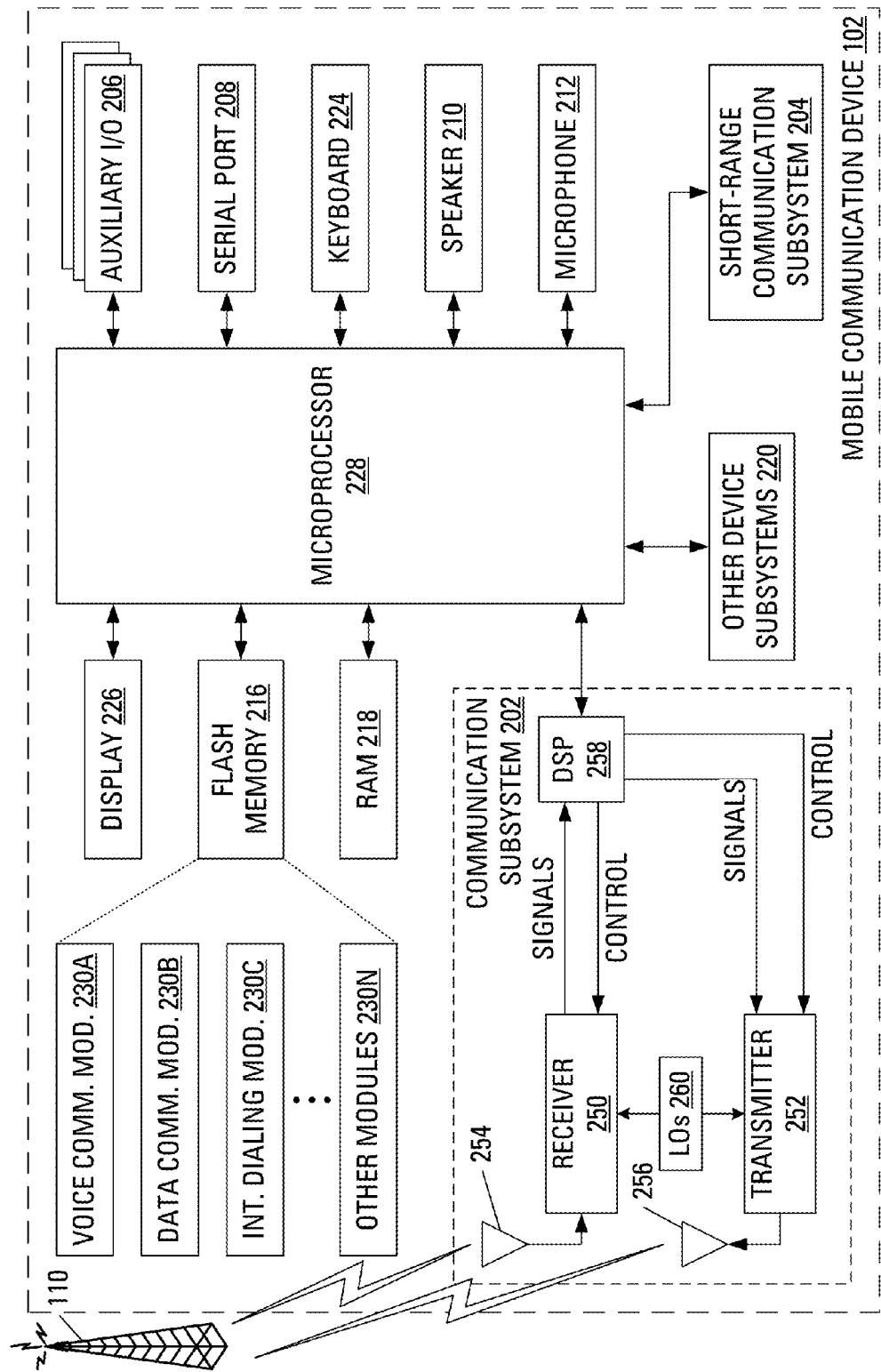
FIG. 2 schematically illustrates the handheld computer of FIG. 1.

FIG. 2 illustrates the handheld computer 102 including a housing, an input device (e.g., a keyboard 224 having a plurality of keys) and an output device (a display 226), which is preferably a full graphic, or full color, Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the handheld computer 102, in part, responsive to actuation of the keys on the keyboard 224 by a user.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the handheld computer 102 are shown schematically in FIG. 2. These include: a communications subsystem 200; a short-range communications subsystem 202; the keyboard 224 and the display 226, along with other input/output devices including a set of auxiliary I/O devices 206, a serial port 208, a speaker 210 and a microphone 212; as well as memory devices including a flash memory 216 and a Random Access Memory (RAM) 218; and various other device subsystems 220. The handheld computer 102 is preferably a two-way radio frequency (RF) communication device having voice and data communication capabilities. In addition, the handheld computer 102 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the handheld computer 102. A predetermined set of software applications that control basic device operations, such as a voice communications module 230A and a data communications module 230B, may be installed on the handheld computer 102 during manufacture. A serial bypass module 230C may also be installed on the handheld computer 102 during manufacture, to implement aspects of the present application. As well, additional software modules, illustrated as an other software module 230N, which may be, for instance, a PIM application, may be installed during manufacture. The PIM application is preferably capable of organizing and managing data items, such as e-mail messages, calendar events, voice mail messages, appointments and task items. The PIM application is also preferably capable of sending and receiving data items via the wireless carrier network 110. Preferably, the data items managed by the PIM application are seamlessly integrated, synchronized and updated via the wireless carrier network 110 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the handheld computer 102 is intended to operate. For example, the communication subsystem 202 of the handheld computer 102 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the handheld computer 102.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the handheld computer 102 may send and receive communication signals over the wireless carrier network 110. Signals received from the wireless carrier network 110 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 110 are processed (e.g., modulated and encoded) by the DSP 258 and are then provided to the transmitter 252 for digital to analog conversion, frequency up conversion, filtering, amplification and transmission to the wireless carrier network 110 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, or some other type of input device. The composed data items may then be transmitted over the wireless carrier network 110 via the communication subsystem 202.

In a voice communication mode, overall operation of the device is substantially similar to the data communication mode, except that received signals are output to a speaker 210, and signals for transmission are generated by a microphone 212. Alternative voice or audio I/O subsystems, such as a voice message recording subsystem, may also be implemented on the handheld computer 102. In addition, the display 226 may also be utilized in voice communication mode, for example, to display the identity of a calling party, the duration of a voice call, or other voice call related information.

The short-range communications subsystem 204 enables communication between the handheld computer 102 and other proximate systems or devices, which need not necessarily be similar devices. For example, the short-range communications subsystem may include an infrared device and associated circuits and components, or a Bluetooth™ communication module to provide for communication with similarly-enabled systems and devices.

The number of data items maintained by a PIM application executed on a personal computer or executed on a handheld computer generally grows with continued use of the PIM application. Such growth can lead to frustration when trying to place a telephone call to a particular contact in the contact management database stored, for instance, in the flash memory 216 and managed by the address book application of the handheld computer 102.

To assist a user in the task of finding a data item (or database entry), a filtering scheme may be implemented. In one exemplary filtering scheme, a given database entry that is to be subject to filtering is pre-processed to determine a set of keyword strings to associate with the given database entry. For example, a database entry for "Michael Hardy" may be associated with two keywords: "Michael"; and "Hardy". Each keyword is then processed. In particular, when a given keyword is processed, a pattern, or key, may be determined based on the first three characters of the given keyword. The pattern may subsequently be used to quickly find the given database entry using a pattern matching scheme.

In particular, in an exemplary scheme, each character that may be used in a keyword string (e.g., letters, numbers, accented letters, punctuation) may be mapped to a five-bit value, i.e., an integer in the range 1-31, inclusive. For example, a or A may map to 1, b or B may map to 2, . . . , y or Y may map to 25 and z or Z may map to 26. It should be clear, however, that, as each character is entered by a user, it is the character that is shown on the display 226, and not a five-bit value or a decimal integer.

Following this scheme, the keyword "Michael" may be processed, first to determine that the first three characters are "m", "i" and "c", then to map each of the characters to elements, i.e., five-bit values, of the pattern. For this example, "m" maps to 01101 (13), "i" maps to 01001 (9) and "c" maps to 00011 (3). The three five-bit values may be combined to form a single fifteen-bit value, 01101 01001 00011, which may then be converted to a decimal value, 13603. The decimal value may be stored as the pattern for the keyword "Michael". The three five-bit values may be considered to form a pattern that is a three element set or a three-tuple (01101, 01001, 00011) or (13, 9, 3).

This filtering scheme may be used to restrict a list of database entries, such as database entries associated with contacts and stored in the contact management database. For instance, a user interface may be presented to a user of a PIM application to allow the user to find the database entry associated with a particular contact. Initially, the user interface may provide a data entry field on the display 226 and a complete list of the database entries in the contact management database. The user may type characters in the data entry field, where the characters may, for instance, relate to the first name or last name of the particular contact that the user wishes to find. As the user types characters in the data entry field, the list of database entries presented by the address book application user interface may be restricted.

For example, consider an address book application maintaining database entries for three contacts, named Mark Smith, Jason Mindy and Michael Adams, respectively. If the user enters the character "m" in the data entry field of the user interface, the list of database entries will not be restricted, as all three database entries have a keyword for which 01101 will be determined as the first element of a corresponding pattern. If the user adds the character "i" to the data entry field of the user interface, the list of database entries may be restricted to just the database entries representative of Jason Mindy and Michael Adams, i.e., only the database entries associated with a pattern having 01101 as the first element and 01001 as the second element. If the user adds the character "c" to the data entry field of the user interface, the list of database entries may be restricted to just Michael Adams, i.e., the only database entry associated with a pattern having 01101 as the first element, 01001 as the second element and 00011 as the third element. The use of patterns in this filtering scheme may be considered to allow the restriction of the list of database entries to be performed quickly.

It is known to present, in a home screen of a telephone application, a field allowing for manual telephone number entry. It is also known to present, in a home screen of a telephone application, a menu having a menu item that, when selected, provides a field allowing for text entry for filtering database entries in a contact management database managed by the address book application to find a contact and, thereby, allow subsequent selection of a contact telephone number that is to be reached.

In overview, it is proposed herein to present, in a home screen of a telephone application, a single, "integrated" field, which integrated field allows for entry of numeric characters that may be interpreted as manual telephone number entry or for entry of alphabetic characters that may be interpreted as an alphabetic filtering string for filtering database entries in a contact management database managed by the address book application or other data store for automated telephone number selection.

Figure 3:
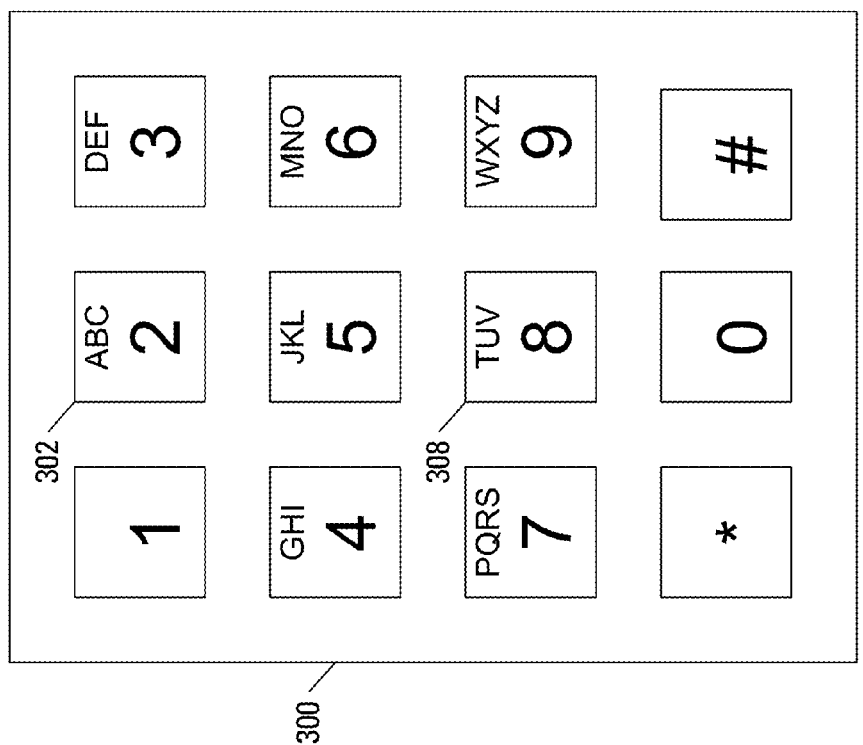
FIG. 3 illustrates a first exemplary keypad for the handheld computer of FIG. 1.
Figure 4:
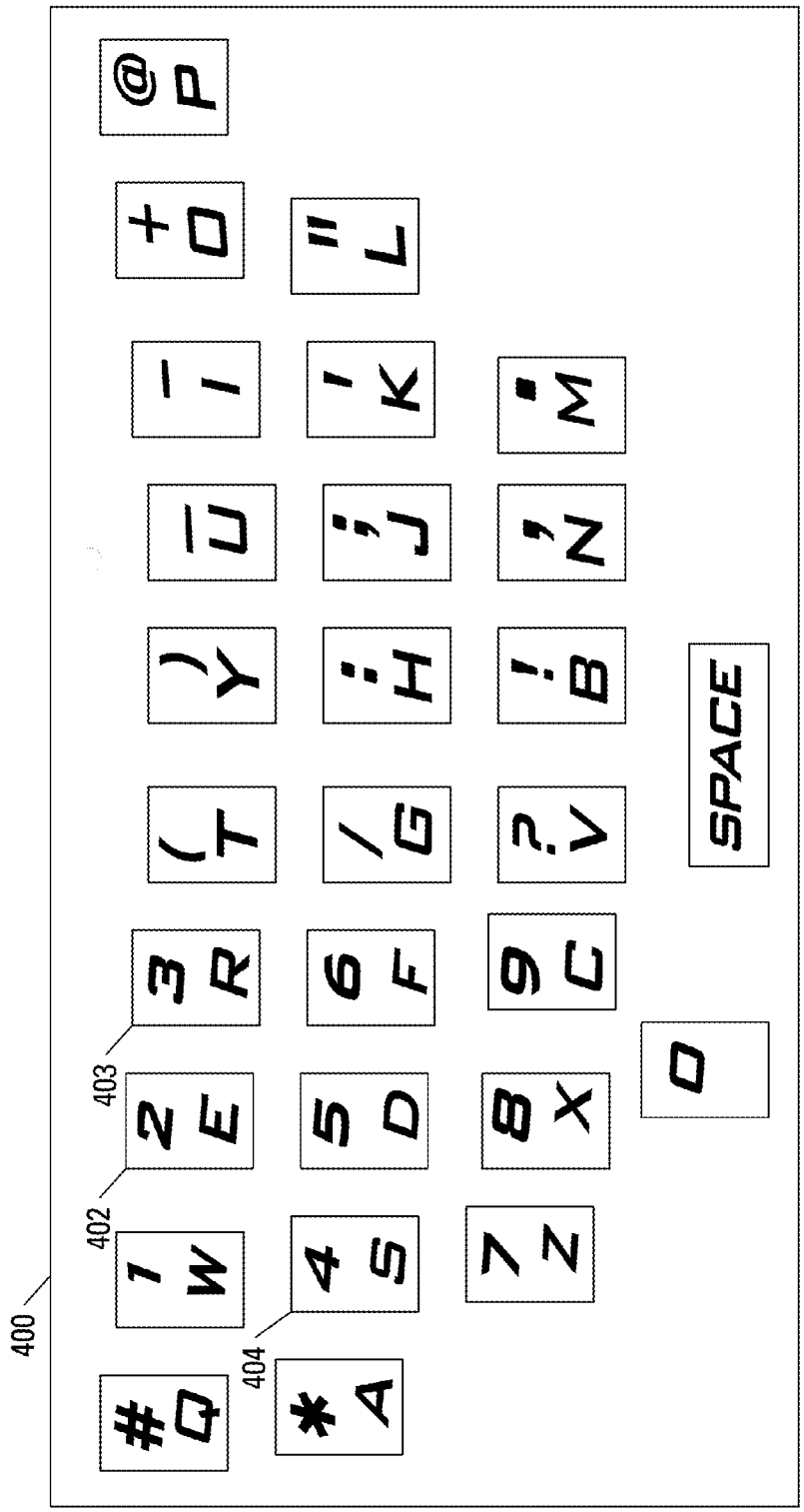
FIG. 4 illustrates a second exemplary keypad for the handheld computer of FIG. 1.

As is known, to conserve the space used for keys in a keyboard of a mobile telecommunication and computing device, it is necessary to configure the keys on the keyboard to represent more than one character. A long familiar example is the typical telephone keyboard 300 (see FIG. 3) on which a single key 302 can be representative of numeric character "2" and alphabetic characters "A", "B" and "C" while another key 308 can be representative of numeric character "8" and alphabetic characters "T", "U" and "V". For QWERTY-type keyboards, there is less sharing, but the sharing is often still in place. In a first known QWERTY-type keyboard 400 (see FIG. 4), one key 402 is representative of alphabetic character "E" and numeric character "2", another key 403 is representative of alphabetic character "R" and numeric character "3" while a third key 404 is representative and alphabetic character "S" and numeric character "4". In a second known QWERTY-type keyboard 500 (see FIG. 5), one key 501 is representative of alphabetic character "E", alphabetic character "R" and numeric character "1", another key 505 is representative of alphabetic character "G", alphabetic character "H" and numeric character "5".

In operation, a user may start pressing keys on the keyboard 224 while the handheld computer 102 is displaying a default, or "home", screen. Such key presses may automatically initialize a telephone application with the integrated field. As each key on the keyboard 224 is pressed, an indication of the pressed key is transmitted from the keyboard 224 to the microprocessor 228. The microprocessor 228 generates multiple filter strings and arranges for the presentation of a display string in the integrated field of the telephone application home screen presented by the display 226. The display string may be one of the multiple filter strings or may be comprised of numeric characters corresponding to the pressed keys.

Figure 6:
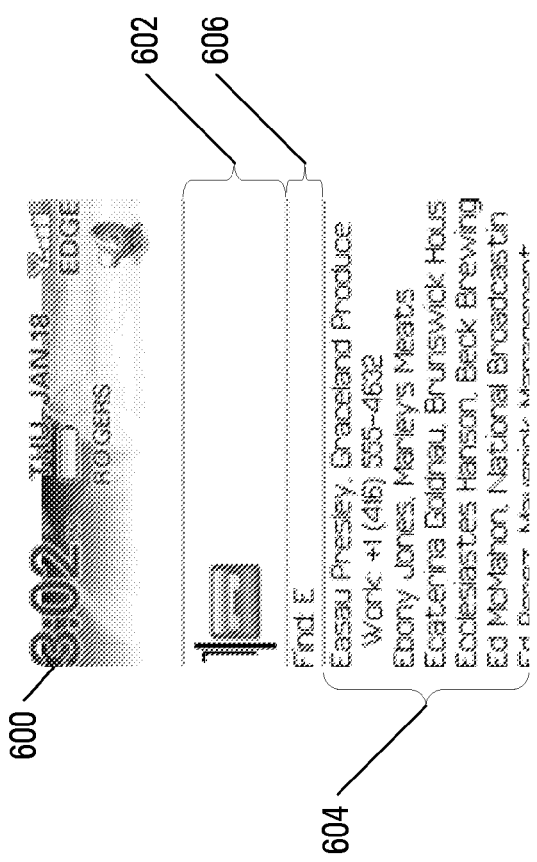
FIG. 6 illustrates an exemplary telephone application home screen presented by the handheld computer of FIG. 1.

FIG. 6 illustrates an exemplary telephone application home screen 600 with the first numeric character ("1") of an exemplary display string displayed in an integrated field 602, with a master list (i.e., a filter result list) presented in a filter result area 604.

Figure 7:
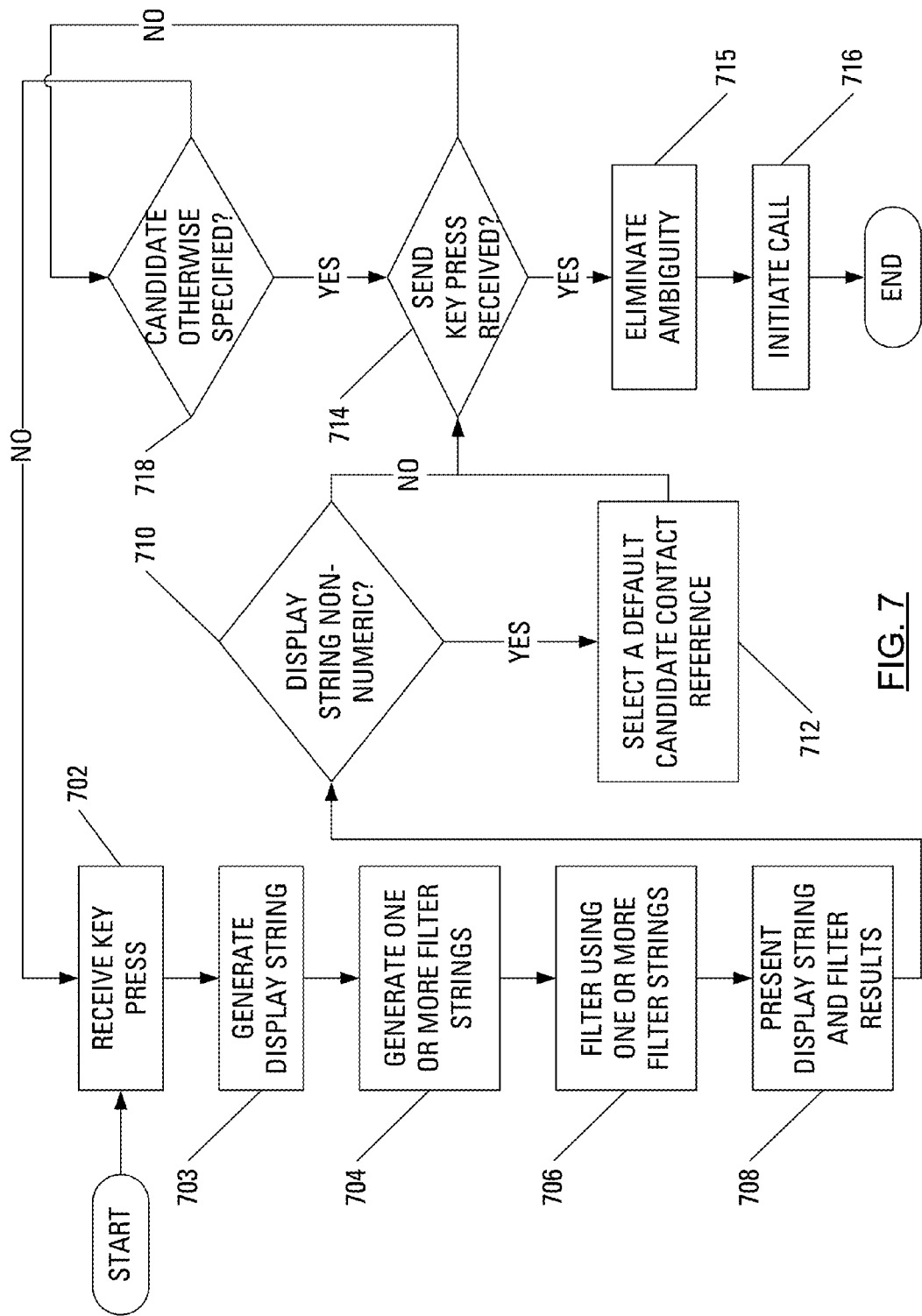
FIG. 7 illustrates exemplary steps in a communication initiation method embodying one aspect of the present application.

FIG. 7 illustrates exemplary steps in a method embodying one aspect of the present application. Initially, the microprocessor 228 receives (step 702) an indication of a first pressed key. See, for instance, FIG. 6 wherein an indication of a press on a key associated at least with the numeric character "1" has been received. As will be discussed in more detail in the following, where the first pressed key is associated with a numeric character, the microprocessor 228 generates (step 703) a numeric display string. Where the first pressed key is associated with alphabetic characters only, the microprocessor 228 generates (step 703) an alphabetic display string. Where the pressed key is associated with multiple characters, the microprocessor 228 generates (step 704) multiple filter strings. In the example of FIG. 6 and using the second known QWERTY-type keyboard 500 of FIG. 5, the key associated with the numeric character "1" is also associated with alphabetic characters "E" and "R". Where the first pressed key is associated with a single character, such as the "M" key in the second known QWERTY-type keyboard 500 of FIG. 5, the microprocessor 228 generates (step 704) a single filter string, "M". A first filter string, among the multiple filter strings, includes only the first character among the multiple characters associated with the pressed key, say, the alphabetically superior character. The first filter string is illustrated in a filter string field 606. The first filter string in the current example is "E". A second filter string, among the multiple filter strings, includes only the second character among the multiple characters associated with the pressed key, etc. Accordingly, the second filter string in the current example is "R".

The microprocessor 228 then filters (step 706) the contact management database managed by the address book application based on each of the one or more filter strings. The filtering may be executed as detailed above or may use any one of many filtering algorithms readily known to a person of ordinary skill in the art. The result of filtering (step 706) the contact management database based on the first filter string may be considered to result in a first list of references to database entries (contacts). The result of filtering (step 706) the contact management database based on the second filter string may be considered to result in a second list of references to database entries, etc. The filtering (step 706) may include the formation of a master list from a union of the first list of references to database entries, the second list of references to database entries and any other list of references to database entries, for instance, a third list of references to database entries resulting from the filtering of another database (e.g., a call log) maintained at the handheld computer 102. Advantageously, there may be a database entry in a call log that refers to a previously received call and, for instance, includes textual Calling Line Identification information. The filtering (step 706) may include a reference to the call log entry in the master list in the situation wherein the textual Calling Line Identification information matches one of the filter strings.

The concept of a union is well-known in set theory to mean the set containing all of the elements of two or more sets. The point of forming a union of the lists of references to database entries is to avoid duplicate references to database entries in the master list.

As illustrated in FIG. 6, the microprocessor 228 arranges to present (step 708) the display string, which was generated in step 703, in the integrated field 602. See FIG. 6, wherein the integrated field 602 presents the display string "1". Where the first pressed key is, at least in part, associated with a numeric character, the microprocessor 228 is arranged to expect that the user is performing a manual telephone number entry. The microprocessor 228 also arranges to present (step 708), in the filter result area 604 of the telephone application home screen 600, at least a portion of the master list generated by the filtering of step 706. If the size of the filter result area 604 is insufficient to display the entire master list, only the first few references to database entries in the master list may be presented, based on criteria such as those discussed below.

The master list includes, for example, a reference to every database entry that has been selected by the filtering process. In an exemplary embodiment, within a database entry that has been selected for inclusion in the master list by the filtering process, there is a first name, a last name or a company name that begins with one of the filter strings. As illustrated in FIG. 6, an exemplary reference to a database entry in the master list displayed in the filter result area 604 of the telephone application home screen 600 includes, space permitting, the first name, the last name and the company name of the contact associated with the referenced database entry. The portion of the master list presented in the filter result area 604 includes references to contacts with a first name starting with the first filter string, "E".

The microprocessor 228 next determines (step 710) whether, based on the key press received in step 702, the display string remains numeric. By default, while the display string remains numeric, the microprocessor 228, responsive to determining (step 714) that the SEND key has been pressed, initiates (step 716) a call to the destination number represented by the display string.

A SEND key press determination may be made associated with any one of a number of other key presses, e.g., a RETURN key press, a SPACE key press, along with a selection action on an auxiliary input mechanism, such as a trackball, track wheel or other similar component.

It is expected that person of ordinary skill in the art will well understand the steps involved in successfully establishing a telephone call after the initiation step (step 716), whether the establishment of the telephone call is to be over a land line or a wireless channel.

If the microprocessor 228 determines (step 714) that a SEND key press has not been received, the microprocessor 228 determines (step 718) whether a candidate contact or telephone number has been otherwise specified. By otherwise specified, it is contemplated that a user may use an auxiliary input mechanism (trackball, track wheel, etc.) to scroll down within the filter results area 604, select a candidate contact or a candidate destination number and press the SEND key. The microprocessor 228, responsive to determining (step 714) that the SEND key has been pressed, initiates (step 716) a call to the selected contact. Where the user has selected a specific destination number for a contact, the microprocessor 228 initiates (step 716) a call to the selected destination number. Where the user has only selected a contact and the selected contact is associated with more than one destination number, the microprocessor 228 acts to eliminate (step 715) the ambiguity as to which destination number a call should be initiated.

The master list may be presented in the filter result area 604 as simply a list of references to contacts, one line of text per contact, with indications, space permitting of first name, last name and company name. While this approach provides a great number of references to the user on one screen, where the user opts to select a contact to which to place a call, a second step is required in the form of answering a question as to which of a plurality of destinations number should be used to initiate the call. Alternatively, each reference to a database entry (e.g., a contact) may be accompanied by subsequent lines of text, one line of text for each of the destination numbers associated with the referenced contact. Advantageously, a user may directly specify the destination number of a given contact to which a call should be initialized. Unfortunately, using the latter filter results presentation only a few contacts will fit the filter results area 604.

As a compromise between these two approaches, the microprocessor 228 may present, in the filter results area 604, a list of references to database entries, with only the first reference to a database entry expanded to subsequent lines of destination numbers (see FIG. 6). The user may opt to explore the references to other database entries in the master list through use of an input device. As the user focuses attention on (highlights) a reference to a database entry through the use of the input device, the microprocessor 228 expands the reference to the database entry to show each destination number associated with the selected database entry. In addition, the microprocessor 228 contracts the previously expanded database entry to hide the associated destination numbers. For an example of this expansion and corresponding contraction, compare an exemplary screen 800 in FIG. 8 to the telephone application home screen 600 in FIG. 6.

Where the microprocessor 228 determines (step 718) that further input specifying a contact or destination number has not been received, the microprocessor 228 may anticipate receiving (step 702) a further key press. As indications of further key presses are received, the display string presented in the integrated field 602 is lengthened (see FIGS. 9 and 10). It is expected that the number of references to database entries in the master list will diminish since, with increasing size of the display string, it is expected that fewer database entries will include a match to one of the filter strings.

Figure 8:
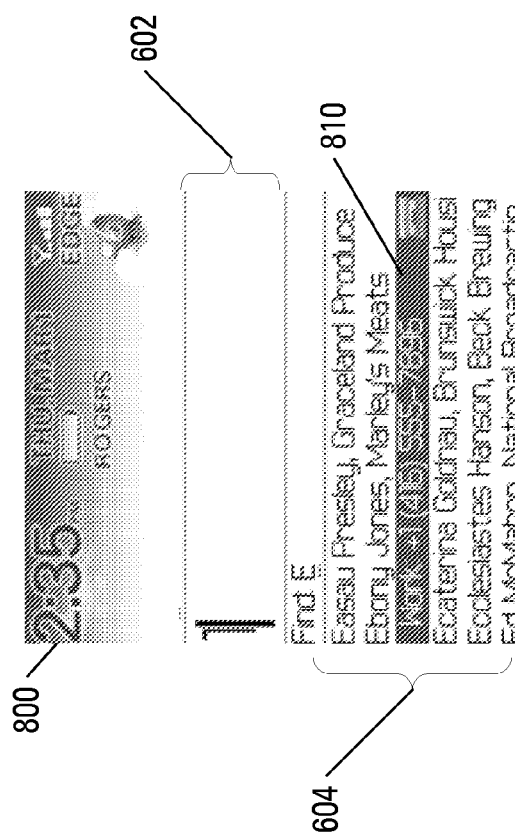
FIG. 8 illustrates an exemplary telephone application screen to illustrate expansion and contraction of references to database entries.
Figure 9:
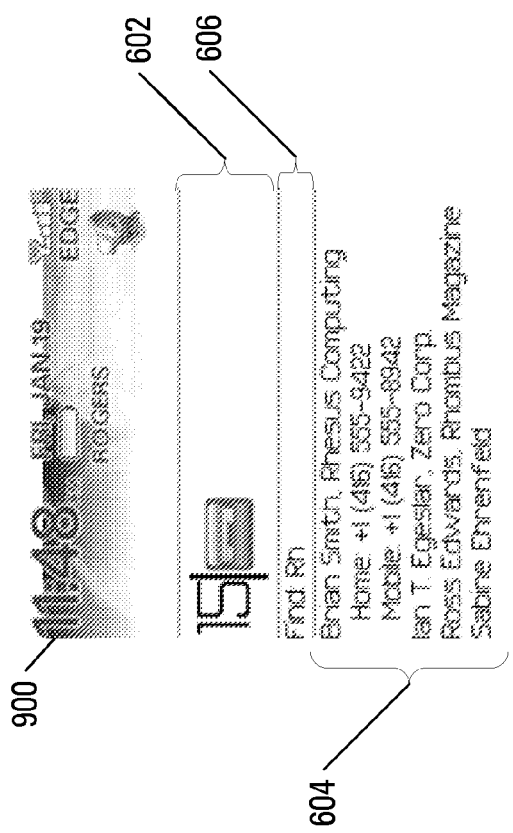
FIG. 9 illustrates the exemplary telephone application home screen of FIG. 6 with additional user input.

In an exemplary screen 900 in FIG. 9, an indication of press on the "5" key has been received. The display string in the integrated field 602 is updated to "15". Using the second known QWERTY-type keyboard 500 of FIG. 5, the "5" key is also associated with "G" and "H". The four filter strings that may be derived from "1" and "5" key presses are: EG; EH; RG; and RH. Accordingly, the master list displayed in the filter result area 604 is updated relative to the exemplary screen 800 of FIG. 8.

Figure 10:
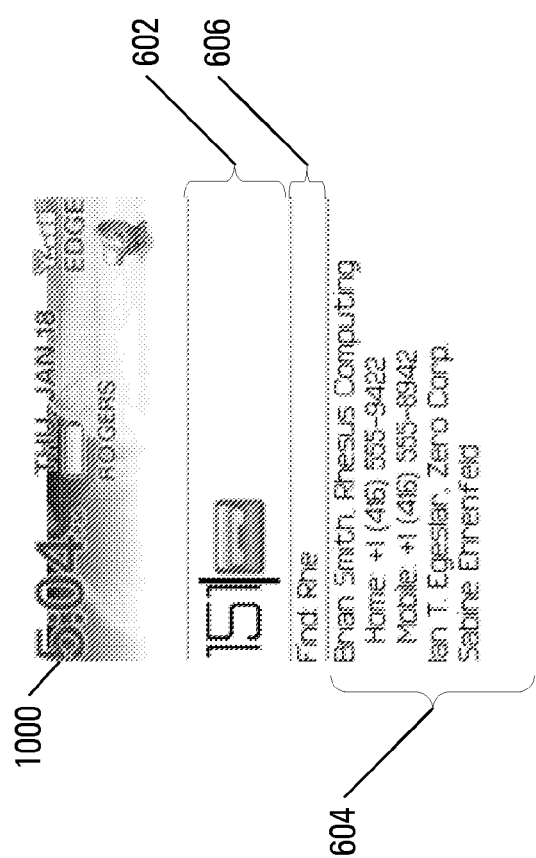
FIG. 10 illustrates the exemplary telephone application home screen of FIG. 9 with additional user input.

In an exemplary screen 1000 in FIG. 10, an indication of press on the "1" key has, once again, been received. The display string in the integrated field 602 is updated to "151". The eight filter strings that may be derived from "1", "5" and "1" key presses are: EGE; EHE; EGR; EHR; RGE; RHE; RGR; and RHR. Accordingly, the master list displayed in the filter result area 604 is updated relative to the exemplary screen 900 of FIG. 9.

Notably, once a non-numeric key press has been received, i.e., a key press on one of the keys that is not associated with a number, the microprocessor 228 changes the display string in the integrated field 602 to one of the multiple filter strings and automatically selects (step 712) a default candidate contact (database entry) reference from among the references in the master list displayed in the filter result area 604. In an exemplary screen 1100 in FIG. 11, an indication of press on the "S" key has been received. The display string in the integrated field 602 is updated to "Rhes" and the filter string field 606 (see FIG. 6) is removed as it would be redundant. The sixteen filter strings that may be derived from "E/R", "G/H", "E/R" and "NS" key presses are: EGEA; EHEA; EGRA; EHRA; EGES; EHES; EGRS; EHRS; RGEA; RHEA; RGRA; RHRA; RGES; RHES; RGRS; and RHRS. Accordingly, the master list displayed in the filter result area 604 is updated relative to the exemplary screen 1000 of FIG. 10. In an exemplary embodiment, the microprocessor 228 selects the first database entry reference in the master list displayed in the filter result area 604, as illustrated in the exemplary screen 1100 in FIG. 11, wherein the receipt of an indication of an "S" key press has ended the possibility that the user is performing a manual destination number entry (since, in the second known QWERTY-type keyboard 500 of FIG. 5, the A/S key is not associated with a number but, instead, is associated with a question mark, "?").

Notably, as presented so far, while each key in the set of received key presses is associated, at least in part, with a numeric character, it is expected that the user is performing a manual destination number entry and, consequently, the display string in the integrated field 602 is entirely numeric. Additionally, an icon is illustrated beside the vertical-line cursor in the integrated field 602. As illustrated in FIGS. 9 and 10, a handset button icon accompanies the display string and the vertical-line cursor in the integrated field 602.

The handset button icon may be used to indicate that the sequence of numbers in the display string will be dialed responsive to the user pressing the handset button on the keyboard 224 of the handheld computer 102 to initiate a call. As illustrated in FIG. 8, responsive to the user manipulating the user interface to move focus away from the integrated field 602 and, instead, to focus on a specific reference to a database entry in the filter result area 604, the handset button icon is not shown in the integrated field 602. Notably, however, the handset button icon is shown in association with the directory number on which the user has placed focus, thereby indicating that the selected directory number will be dialed responsive to the user pressing the handset button on the keyboard 224 of the handheld computer 102 to initiate a call.

The automatic selection (step 712) of a default candidate contact may be based on selection criteria that may vary from rudimentary to complex. In the implementation illustrated in the exemplary screen 1100 in FIG. 11, the microprocessor 228 has organized the database entry references in the master list and then automatically selected the first database entry reference in the list. In FIGS. 6, 8, 9, 10 and 11, the microprocessor 228 has organized the master list alphabetically by first name. In particular, the master list, as displayed in the filter result area 604 in the screen 900 of FIG. 9 begins with a reference to a database entry having a company name that begins with the filter string "RH". The master list continues with a reference to a database entry having a last name that begins the filter string "EG". The master list continues with a reference to a database entry having a company name that begins the filter string "RH". The master list finishes with a reference to a database entry having a last name that begins the filter string "EH". The master list is organized alphabetically by first name so that "Brian" precedes "Ian", which precedes "Ross", which precedes "Sabine".

Figure 11:
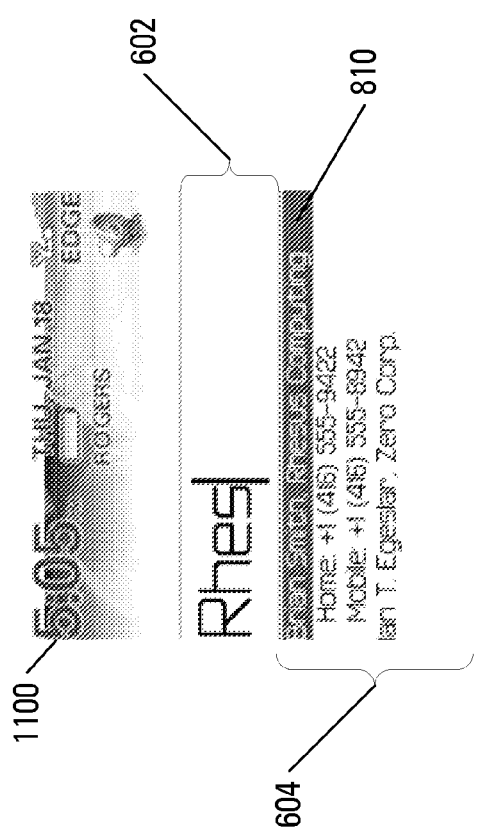
FIG. 11 illustrates the exemplary telephone application home screen of FIG. 10 with additional user input.

Notably, in the transition from a numeric display mode in FIG. 10 to an alphabetic display mode in FIG. 11, the handset button icon has disappeared. The automatic selection (step 712) of a default candidate contact has removed focus from the integrated field 602.

In one embodiment, the microprocessor 228 selects (step 712) the reference to the database entry with the alphabetically superior first name as the default candidate reference and associates a "Selected" indication with the default candidate reference in the filter result area 604. The Selected indication provides an indication, to the user, of the reference, among the displayed references, that is associated with a destination number that would be called responsive to receiving an indication of a press on a "Send" key (or, for further examples, an "Enter" key or a "Space" key) on the keyboard 224 of the handheld computer 102. The Selected indication may be achieved through the use of a secondary background color for the selected reference, as illustrated by a Selected indication 810 in FIGS. 8 and 11. The secondary background color may be chosen to contrast with the primary background color of the rest of the exemplary telephone application screen. Additionally, the color of the font used to display the selected candidate reference may be chosen to improve readability when displayed with the secondary background color.

Where the microprocessor 228 has determined (step 710) that, based on the key press received in step 702, the display string has changed to non-numeric (see FIG. 11) and a default candidate reference has been automatically selected (step 712) and the default candidate reference has been associated with the Selected indication (see FIG. 11), the microprocessor 228, responsive to determining (step 714) that the SEND key has been pressed, initiates (step 716) a call to a destination number listed in the database entry referred to by the default candidate reference. If the candidate reference is associated with a database entry having more than one destination number, the microprocessor 228 eliminates (step 715) the ambiguity as to which destination number should be specified when initiating a call before initiating (step 716) the call to a destination number associated with the candidate reference.

Figure 12:
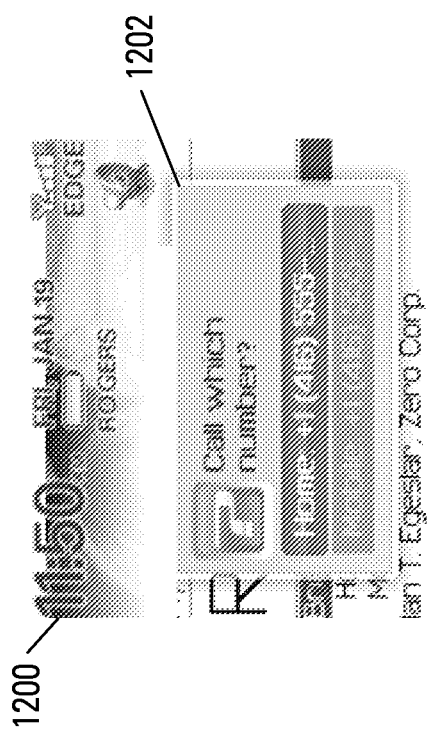
FIG. 12 illustrates the exemplary telephone application home screen of FIG. 1 with a disambiguation dialog box soliciting further user input.

In an exemplary embodiment, illustrated in FIG. 12, the microprocessor 228 eliminates ambiguity by presenting a dialog box 1202 over an exemplary screen 1200, thereby providing the user with an opportunity to use an input device to select a destination number among the multiple destination numbers. Upon receiving an indication of a selected destination number, the microprocessor 228 then initiates a call (step 716) to the selected destination number.

If, rather than pressing the SEND key while the default candidate reference has been associated with the Selected indication, the user, instead, selects the default candidate reference using a user input device, the microprocessor 228 may responsively provide and alternative menu. Selecting using a user input device may, for instance, involve a downward click on a trackball, an inward click on a side-mounted trackwheel or a touch on a touch-sensitive screen. The alternative menu may provide the user with many options for reaching the contact associated with the default candidate reference.

Figure 13:
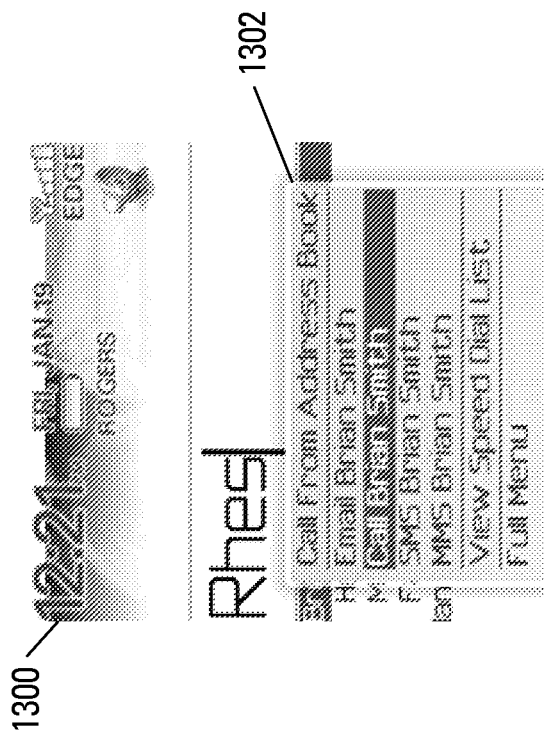
FIG. 13 illustrates the exemplary telephone application home screen of FIG. 1 with a dialog box soliciting further user input regarding manner of communication with the selected contact.

In an exemplary embodiment, illustrated in FIG. 13, the microprocessor 228 responds to receipt of a select indication by presenting a dialog box 1302 over an exemplary screen 1300, thereby providing the user with an opportunity to use an input device to select a manner of reaching the contact associated with the database entry referred to by the default candidate reference. In the exemplary dialog box 1302, the user may elect to place a telephone call to the contact, send an e-mail message to the contact, send a Short Messaging Service (SMS) message to the contact or send a Multimedia Messaging Service (MMS) message to the contact. It is also contemplated that some contacts may be reachable using an instant messaging application or a proprietary messaging application. Upon receiving an indication of a selected manner of reaching the contact, the microprocessor 228 then initiates an application to handle the reaching of the contact using the selected manner.

In known devices, if numeric input is expected, an "ALT" key (or similar) must be held while pressing a key associated with both an alphabetic character and a numeric character to insert the alphabetic character in the filter string. Conversely, if alphabetic input is expected, the "ALT" key (or similar) may be necessary to select a numeric character on a key associated with both an alphabetic character and a numeric character. Advantageously, the aspect of the present application that allows ambiguous filter string entry saves a user from having to use more than one finger when typing a filter string. The ambiguity stems from the microprocessor 228 lacking foreknowledge as to whether the user is manually entering a destination number to which to initiate a telephone call or entering a filter string for use in filtering a contact database and initiating communication, in some manner, with a contact a reference to which is found in the filter results.

While such an approach may add complexity, the generation of alternative filter strings in step 704 may involve generating filter strings that combine alphabetic characters and numeric characters. For instance, consider key 404 in the first known QWERTY-type keyboard 400 of FIG. 4, which key is representative of both the alphabetic character "S" and the numeric character "4". Consequently, as described thus far, when the key is pressed twice, the alternative filter strings are "44" and "SS". Combination filter strings may also be generated, such as "S4" and "4S". The latter string may be of value in filtering to find a contact with a company name "4Seasons".

Additionally, the generation of alternative filter strings in step 704 may involve generating filter strings only including numeric characters. In an example presented hereinbefore, the display string is "151" and the filter strings are: EGE; EHE; EGR; EHR; RGE; RHE; RGR; and RHR. By adding "151" to the list of filter strings and filtering appropriately, the filtering may more easily capture entries in the call log that may not have associated textual information. While the call log is likely to contain references to called directory numbers that are associated with entries in the contact management database, there may also be directory numbers that have been manually entered and have no association with entries in the contact management database. Indeed, as the master list presented in the display is narrowed by further numerical entry in the integrated field, the master list may include references to entries in the contact management database in addition to entries in the call log database. Some of the entries in the master list may be duplicates, where a destination number in the call log is associated with a contact database entry. To distinguish, in the master list, a given entry that is from the call log and does not have an association with an entry in the contact management database, a graphical icon may be presented in the display, associated with the given entry.

It is known, in devices that allow the sending of electronic messages and placing of calls, that, where only some contact information is known, further information can be provided through a connection to a server maintaining a global address list. For instance, when composing an e-mail message to a recipient that does not have an e-mail address specified in the contact management database managed by the address book application, a "look-up" function may be implemented to request of the server, an e-mail address associated with the name (or, for another example, initials) of the recipient.

The inventors anticipate that the otherwise specified candidate telephone number determined step 718 may involve initiating a "look-up" function to be based on the display string shown in the integrated field 602. Such initiation may involve, for instance, causing a user interface menu to be displayed, where one of the menu items is representative of the "look-up" function. In another use of the global address list, when a reference is part of a master list, yet the database entry to which the reference refers does not have an associated telephone number, the user may select the contact, invoke a user interface menu for alternate mode of communication and request that a look-up of the contact name in the global address list. The user may then use any of the information (e.g., telephone number, e-mail address, etc.) returned by the global address list server to communicate with the contact.

As should be clear to a person of ordinary skill in the art, the present application is not limited to PDAs with mobile telephone capabilities. A wide range of telephone terminal apparatus may make use of the integrated dialing described herein, including wired and wireless handsets designed for use in initiating telephone calls through the Public Switch Telephone Network and handsets designed for use in initiating telephone calls through a data network, for example, using the known Voice over Internet Protocol.

Notably, the contact management database managed by the address book application of the handheld computer 102 may not be the only data store filtered in step 706. It is common for handheld computers with mobile telephone capabilities to maintain a "Call Log" with an entry in the Call Log for each incoming and outgoing call. Such entries often include an identification of the calling party telephone number (for incoming calls) or the called party telephone number (for outgoing calls), a time of day and duration of the call. Where the filtering step (step 706) filters the contact management database in conjunction with the Call Log, more results may be present in the master list. The order of presentation of the Call Log entry reference in the master list may be specified so that more recent entries are listed higher in the master list.

It has been contemplated, though not shown, that an icon, in addition to the handset button icon, could be used in the integrated field 602, or elsewhere on the exemplary telephone application home screen 600, to indicate the mode (e.g., numeric mode, alphabetic mode) of display string entry. Such an icon may not, initially, appear necessary to distinguish between only two modes of display string entry. However, further modes of display string entry have been considered. For instance, an alphanumeric mode may useful when searching for a contact with a company name "4Seasons". Additionally, it is well known that companies advertise a toll-free directory number to encourage customer contact. Examples include 1-888-ROGERS-1 and 1-800-SHIP-123. Such alphanumeric directory numbers rely on letter-number correspondences as found on the typical telephone keyboard 300 (see FIG. 3). To accommodate such directory numbers, a "toll-free" mode of display string entry is proposed. In the toll-free mode, the user may enter the exemplary 1888ROGERS1 in the integrated field 602 and initiate a call, responsively, the microprocessor 228 translates the contents of the integrated field 602 to obtain 1-888-764-3771 and arranges the outgoing call. Notably, using the second known QWERTY-type keyboard 500 of FIG. 5 and the automated display mode change as outlined above, the display string will remain numeric as far as 18881, but, once the "0" key is pressed, the display string will change to "Ebbbeo" and will eventually read "Ebbbeogeeae".

It may be that the user has foreknowledge that 1888ROGERS1 translates to 1-888-764-3771 but, prefers alphanumeric entry. In such a case, it has been contemplated that a translation field (not shown) may be presented above or below the integrated field 602 to show an ongoing translation of the characters being entered in the integrated field 602 in toll-free mode. A predetermined key combination (e.g., alt-T) may be used to turn display of the translation field on or off.

Figure 5:
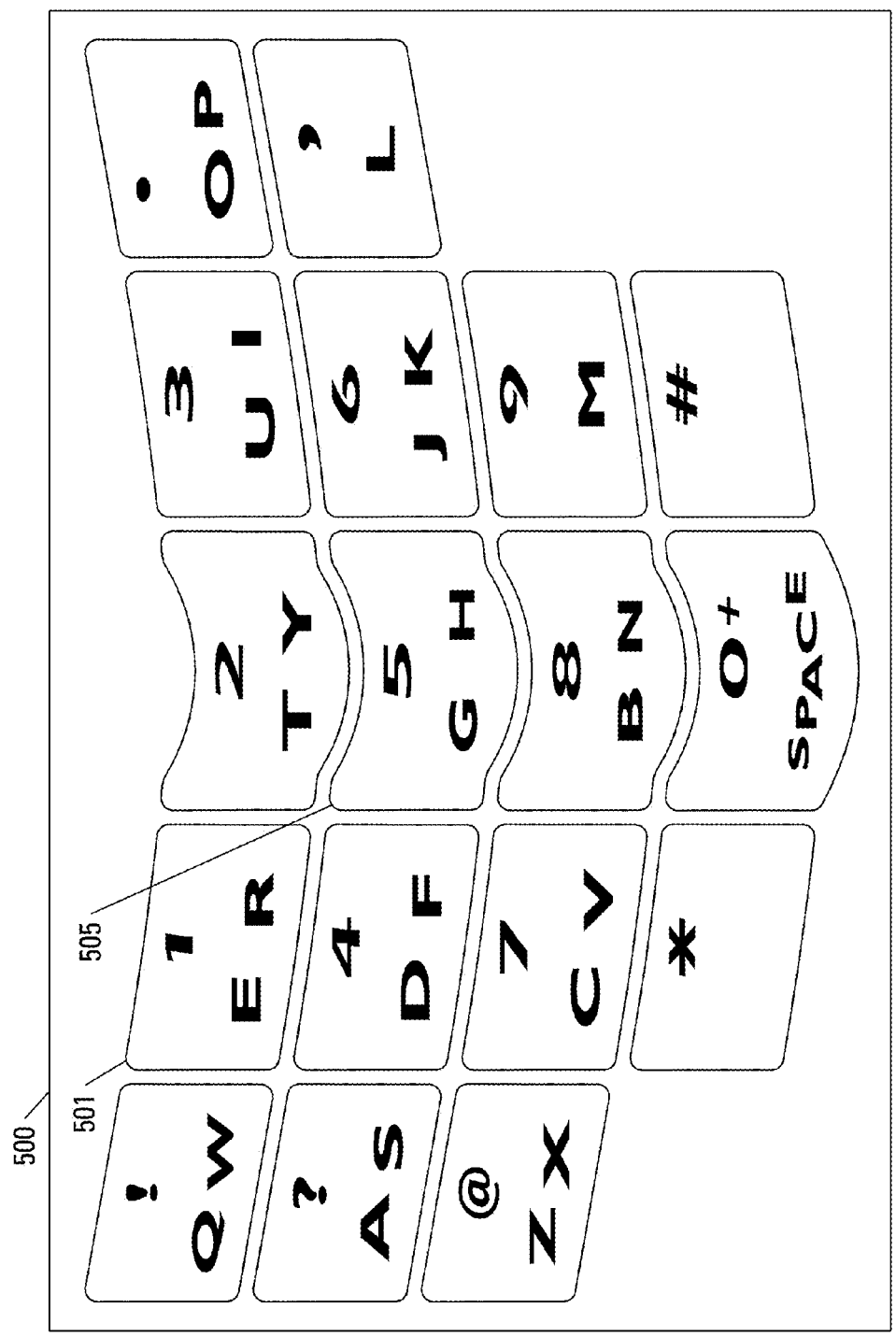
FIG. 5 illustrates a third exemplary keypad for the handheld computer of FIG. 1.

For entering an alphanumeric directory number using the second known QWERTY-type keyboard 500 of FIG. 5, the user may use the known multi-tap method where each tap of a key cycles through the possible values for the key. For instance, a single tap on the key 501 on the second known QWERTY-type keyboard 500 of FIG. 5 results in alphabetic character "E" appearing beside the cursor, a double tap on the key 501 results in alphabetic character "R" appearing beside the cursor and a triple tap on the key 501 results in the numeric character "1" appearing beside the cursor.

The mode of display string entry may be selected by the user. For instance, the user may initiate the appearance of a menu on the exemplary telephone application home screen 600 and select a menu item to select a particular mode of display string entry. Alternatively, a combination of key presses may allow for a change in mode of display string entry. For instance, an "Alt" key (not shown on either the first known QWERTY-type keyboard 400 of FIG. 4 or the second known QWERTY-type keyboard 500 of FIG. 5) may be pressed in conjunction with the "M" key to toggle modes of display string entry. Where there are more than two modes of display string entry, the "Alt-M" combination may cycle through the various modes while indicating the selected mode in the integrated field 602 or elsewhere on the exemplary telephone application home screen 600.

The above-described embodiments of the present application are intended to be examples only. Alterations, modifications and variations may be effected to the particular embodiments by those skilled in the art without departing from the scope of the application, which is defined by the claims appended hereto.

We claim:

1. A method of initiating a communication, the method comprising:
    filtering a contact management database to form a first list of references, wherein the references in the first list include a first filter string to which has been added a first alphabetic character associated with a selected key;
    filtering the contact management database to form a second list of references, wherein the references in the second list include a second filter string to which has been added a second alphabetic character associated with the selected key;
    forming a master list from the first list and the second list;
    receiving an indication of a selection, from a display string to which a numeric character associated with the selected key has been added, and a given reference in the master list; and
    based on the selection, initiating a communication.

2. The method of claim 1 further comprising presenting, on a display, an indication of a selection of a default candidate reference in the master list of references to database entries.

3. The method of claim 2 further comprising displaying a list of destination numbers from a database entry associated with the default candidate reference.

4. The method of claim 2 further comprising selecting, based on received input, a new reference in the master list of references as the default candidate reference.

5. The method of claim 4 further comprising displaying a list of destination numbers from a database entry associated with the new reference.

6. The method of claim 2 further comprising:
    receiving input specific to the default candidate reference; and
    responsive to the receiving the input, presenting, on the display, a plurality of manners in which to communicate with a party associated with the default candidate reference.

7. The method of claim 6 wherein the plurality of manners in which to communicate with the party includes placing a telephone call.

8. The method of claim 6 wherein the plurality of manners in which to communicate with the party includes sending a Short Messaging Service message.

9. The method of claim 6 wherein the plurality of manners in which to communicate with the party includes sending an instant message.

10. The method of claim 6 wherein the plurality of manners in which to communicate with the party includes sending a Multimedia Messaging Service message.

11. The method of claim 6 wherein the plurality of manners in which to communicate with the party includes sending an e-mail message.

12. The method of claim 1 further comprising:
    filtering a database of incoming and outgoing calls to form a third list of references, wherein the references in the third list include the first filter string;
    filtering the database of incoming and outgoing calls to form a fourth list of references, wherein the references in the fourth list include the second filter string; and
    wherein the forming the master list includes forming the master list from the first list, the second list, the third list and the fourth list.

13. An apparatus for initiating a communication, the apparatus comprising:
    a memory;
    a contact management database stored in the memory;
    keyboard having a plurality of keys, the keyboard arranged to transmit an indication of a selection of a given key among the plurality of keys;
    a processor arranged to:
        filter the contact management database to form a first list of references, wherein the references in the first list include a first filter string to which has been added a first alphabetic character associated with a selected key;
        filter the contact management database to form a second list of references, wherein the references in the second list include a second filter string to which has been added a second alphabetic character associated with the selected key;

form a master list from the first list and the second list;
receive an indication of a selection, from a display string to which a numeric character associated with the selected key has been added, and a given reference in the master list; and
initiate a communication based on the selection.

14. The apparatus of claim 13 wherein the processor is further arranged to present, on a display, an indication of a selection of a default candidate reference in the master list.

15. The apparatus of claim 14 wherein the processor is further arranged to display a list of destination numbers associated with the default candidate reference.

16. The apparatus of claim 14 wherein the processor is further arranged to select, based on received input, a new reference in the master list as the default candidate reference.

17. The apparatus of claim 16 wherein the processor is further arranged to display a list of destination numbers associated with the new reference.

18. The apparatus of claim 14 wherein the processor is further arranged to:
receive input specific to the default candidate; and
present on the display, responsive to the receiving the input, a plurality of manners in which to communicate with a party associated with the default candidate.

19. The apparatus of claim 18 wherein the plurality of manners in which to communicate with the party includes placing a telephone call.

20. The apparatus of claim 18 wherein the plurality of manners in which to communicate with the party includes sending a Short Messaging Service message.

21. The apparatus of claim 18 wherein the plurality of manners in which to communicate with the party includes sending an instant message.

22. The apparatus of claim 18 wherein the plurality of manners in which to communicate with the party includes sending a Multimedia Messaging Service message.

23. The apparatus of claim 18 wherein the plurality of manners in which to communicate with the party includes sending an e-mail message.

24. The apparatus of claim 13 further comprising:
filtering a database of incoming and outgoing calls to form a third list of references, wherein the references in the third list include the first filter string;
filtering the database of incoming and outgoing calls to form a fourth list of references, wherein the references in the fourth list include the second filter string; and
wherein the forming the master list includes forming the master list from the first list, the second list, the third list and the fourth list.

25. A non-transitory computer readable medium containing computer-executable instructions that, when performed by processor in a telephony device, cause the processor to:
filter the contact management database to form a first list of references, wherein the references in the first list include a first filter string to which has been added a first alphabetic character associated with a selected key;
filter the contact management database to form a second list of references, wherein the references in the second list include a second filter string to which has been added a second alphabetic character associated with the selected key;
form a master list from the first list and the second list;
receive an indication of a selection, from a display string to which a numeric character associated with the selected key has been added, and a given reference in the master list; and
initiate a communication based on the selection.

* * * * *